US011843316B2

(12) United States Patent
Ye et al.

(10) Patent No.: US 11,843,316 B2
(45) Date of Patent: Dec. 12, 2023

(54) WIDE-VOLTAGE-RANGE DC-DC CONVERTERS

(71) Applicant: Huawei Digital Power Technologies Co., Ltd., Shenzhen (CN)

(72) Inventors: Liming Ye, Frisco, TX (US); Heping Dai, Plano, TX (US)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/932,574

(22) Filed: Jul. 17, 2020

(65) Prior Publication Data

US 2021/0091677 A1    Mar. 25, 2021

Related U.S. Application Data

(63) Continuation of application No. PCT/US2019/052879, filed on Sep. 25, 2019.

(51) Int. Cl.
*H02M 3/335* (2006.01)
*H02M 3/158* (2006.01)
(Continued)

(52) U.S. Cl.
CPC .......... *H02M 3/158* (2013.01); *H02M 3/01* (2021.05); *H02M 3/33573* (2021.05);
(Continued)

(58) Field of Classification Search
CPC ...... H02M 1/0003; H02M 1/007; H02M 3/07; H02M 3/33592; H02M 3/156; H02M 3/158; H02M 3/1588
See application file for complete search history.

(56) References Cited

U.S. PATENT DOCUMENTS 6,198,642 B1 *  3/2001  Kociecki ............. H02M 1/4225
                                                           363/37
10,720,842 B1 *  7/2020  Wu ........................ H02M 1/08
(Continued)

FOREIGN PATENT DOCUMENTS

CN          106849686 B        8/2018
CN          109586574 A        4/2019
(Continued)

OTHER PUBLICATIONS

International Search Report & the Written Opinion of the International Searching Authority dated May 7, 2020, International Application No. PCT/US2019/052879.
(Continued)

*Primary Examiner* — Gary L Laxton
(74) *Attorney, Agent, or Firm* — Vierra Magen Marcus LLP (57) ABSTRACT

According to one aspect, an apparatus comprising a two stage DC-DC converter is provided. The converter consists of a multilevel DC-DC converter stage cascaded with a fixed voltage ratio DC-DC converter stage. The converter is controlled so that a first stage of the converter provides an optimized output (a regulated bus voltage) which serves as the input to the second stage. The multilevel DC-DC converter may be the first stage and the fixed voltage ratio, unregulated DC-DC converter may be the second stage converter. Alternatively, the fixed voltage ratio, unregulated DC-DC converter may be the first stage and the multilevel DC-DC converter may be the second stage.

12 Claims, 9 Drawing Sheets

(51) Int. Cl.
*H02M 7/483* (2007.01)
*H02M 3/00* (2006.01)
*H02M 1/00* (2006.01)

(52) U.S. Cl.
CPC ..... *H02M 3/33592* (2013.01); *H02M 7/4837* (2021.05); *H02M 1/0003* (2021.05)

(56) References Cited

U.S. PATENT DOCUMENTS

2017/0063251 A1* 3/2017 Ye .................... H02M 3/33576
2018/0294732 A1* 10/2018 Ye ........................... H02M 3/01

FOREIGN PATENT DOCUMENTS

| CN | 109889048 A | 6/2019 |
| JP | 2017038424 A | 2/2017 |

OTHER PUBLICATIONS

English Abstract of CN Publication No. CN109889048 published Jun. 14, 2019.
English Abstract of JP Publication No. JP2017038424 published Feb. 16, 2017.
English Abstract of CN Publication No. CN109586574 published Apr. 5, 2019.
International Preliminary Report on Patentability dated Apr. 7, 2022, International Application No. PCT/US2019/052879.
Serkan Dusmez et al., Comparative Analysis of Bidirectional Three-Level DC-DC Converter for Automotive Applications, IEEE Transactions on Industrial Electronics, vol. 62, No. 5, May 2015, 11 pages.
Communication Pursuant to Article 94(3) EPC dated Oct. 5, 2022, European Patent Application No. 19783884.0.
Communication Pursuant to Article 94(3) EPC dated Apr. 26, 2023, European Patent Application No. 19783884.0.
Texas Instruments: "3-Level Buck Converter: How it Works?", May 23, 2018 (May 23, 2018), XP093079536, total 2 pages.
Summons to Attend Oral Proceedings Pursuant to Rule 115(1)(EPC) dated Sep. 15, 2023, European Patent Application No. 19783884.0.

* cited by examiner

FIG. 4
D=Vbus/Vin_min=0.8333

FIG. 5
D=Vbus/Vin_typ=0.625

FIG. 6
D=Vbus/Vin_max=0.4

FIG. 7

FIG. 8
D=Vbus/Vin_min=0.8333

FIG. 9
D=Vbus/Vin_typ=0.625

FIG. 10
D=Vbus/Vin_max=0.4

WIDE-VOLTAGE-RANGE DC-DC CONVERTERS

CLAIM FOR PRIORITY

This application is a continuation of and claims the benefit of priority to International Appl. No. PCT/US2019/052879, filed Sep. 25, 2019, the contents of which are hereby incorporated by reference.

FIELD

The disclosure generally relates to the field of electric power converters, and in particular DC-DC converters.

BACKGROUND

Electric power circuits include AC-DC power converters and DC-DC power converters. DC-DC converters which find uses in telecommunication base stations, computing data centers, electric vehicle chargers, and many other types of equipment. High-power-density, high conversion efficiency and a wide input/output voltage range are all highly desirable characteristics for DC-DC converters, however it is challenging to achieve all three of such characteristics together in DC-DC converters.

Single stage topologies such as LLC converters, phase-shifted full-bridge converters, dual active bridge (DAB) converters, and the like are good topology candidates to achieve this combination of features, but generally suffer from low efficiencies when an input and/or output voltage range is wide. Two-stage DC-DC converters have been used, with a different converter topology for each stage.

BRIEF SUMMARY

According to one aspect of the present disclosure, there is provided an apparatus comprising a DC-DC converter. The converter includes a first converter stage comprising a multi-level converter stage having a first stage input and including a first stage output. The first stage input is configured to receive an input voltage in a range from a minimum voltage (Vin_min) to a maximum voltage (Vin_max), with a typical voltage (Vin_typ) being within the range. The multi-level converter stage is configured to output a regulated bus voltage (Vbus) to the first stage output. The converter also includes a second converter stage comprising a voltage ratio converter stage including a second stage input coupled to the first stage output to receive the regulated bus voltage and also including a second stage output. The voltage ratio converter stage is configured to output a second stage output voltage (Vout) to the second stage output. The regulated bus voltage is defined by a voltage conversion ratio ("n") of the regulated bus voltage over the second stage output voltage. The multi-level converter stage may comprise a buck converter configured to cause the regulated bus voltage to be in a range of Vin_typ/2 to Vin_min when Vin_min is greater than Vin_typ/2, or the multi-level converter stage may comprise a boost converter configured to cause the regulated bus voltage to be in a range of Vin_max to Vin_typ*2 when Vin_max is less than Vin_typ*2.

Optionally, in any of the preceding aspects the multi-level converter stage comprises a buck converter and Vin_min is greater than Vin_typ/2 and the voltage ratio converter stage has a wide output voltage range including a minimum output voltage (Vout_min), a typical output voltage (Vout_typ), and a maximum output voltage (Vout_max). In such aspects, the voltage conversion ratio ("n") of the second stage is equal to or less than Vin_min/Vout_max; and the regulated bus voltage is within the wider of a range of Vin_typ/2 to Vin_min or a range of n*Vout_min to Vin_min.

Optionally, in any of the preceding aspects the multi-level converter stage comprises a boost converter and Vin_max is less than Vin_typ*2 and the voltage ratio converter stage has a wide output voltage range including a minimum output voltage (Vout_min), a typical output voltage (Vout_typ), and a maximum output voltage (Vout_max). In such aspects, the voltage conversion ratio of the second stage is equal to or greater than Vin_max/Vout_min and the regulated bus voltage is within the wider of a range of Vin_max to Vin_typ*2 or Vin_max to n*Vout_max.

According to another aspect of the present disclosure a DC-DC converter comprises a first multi-level buck converter stage having a first stage input and including a first stage output, the first stage input configured to receive an input voltage in a range from a minimum voltage (Vin_min) to a maximum voltage (Vin_max), with a typical voltage (Vin_typ) being within the range and the multi-level converter stage is configured to output a regulated bus voltage to the first stage output. The DC-DC converter further comprises a second converter stage comprising an isolated voltage ratio converter stage including a second stage input coupled to the first stage output to receive the regulated bus voltage and also including a second stage output, the voltage ratio converter stage configured to output a second stage output voltage (Vout) to the second stage output. In this aspect, the regulated bus voltage is defined by a voltage conversion ratio ("n") of the regulated bus voltage over the second stage output voltage, and the buck converter stage is configured to cause the regulated bus voltage to be in a range of Vin_typ/2 to Vin_min when Vin_min is greater than Vin_typ/2.

Optionally, in any of the preceding aspects Vin_min is greater than Vin_typ/2, and the isolated voltage ratio converter stage has a wide output voltage (Vout) range including a minimum output voltage (Vout_min), a typical output voltage (Vout_typ), and a maximum output voltage (Vout_max). In such aspects, the voltage conversion ratio ("n") of the second stage is equal to or less than Vin_min/Vout_max; and the regulated bus voltage is within the wider of a range of Vin_typ/2 to Vin_min or a range of n*Vout_min to Vin_min.

According to another aspect of the present disclosure a DC-DC converter comprises a first converter stage comprising a voltage ratio converter stage having a first stage input and including a first stage output, the first stage input configured to receive an input voltage in a wide range from a minimum voltage (Vin_min) to a maximum voltage (Vin_max), with a typical voltage (Vin_typ), and the voltage ratio converter stage configured to output a non-regulated bus voltage to the first stage output. The DC-DC converter further comprises a second converter stage comprising a multi-level converter stage including a second stage input coupled to the first stage output to receive the non-regulated bus voltage and also including a second stage output, the multi-level converter stage configured to output a second stage output voltage (Vout) to the second stage output, the output voltage range from a minimum output voltage (Vout_min) to a maximum output voltage (Vout_max) with a typical output voltage (Vout_typ). In such aspect, the non-regulated bus voltage is defined by a voltage conversion ratio ("n") of the input voltage over the non-regulated bus voltage of the first stage and the multi-level converter stage comprises a buck converter and its Vout_max is less than Vout_typ*2. Further, the voltage conversion ratio ("n") of the first stage is equal to or less than Vin_min/Vout_max and the non-regulated bus voltage is within the wider of a range of Vout_max to Vout_typ*2 or a range of Vout_max to Vin_max/n.

According to another aspect of the present disclosure a DC-DC converter comprises a first converter stage comprising a voltage ratio converter stage having a first stage input and including a first stage output, the first stage input configured to receive an input voltage in a wide range from a minimum voltage (Vin_min) to a maximum voltage (Vin_max), with a typical voltage (Vin_typ), and the voltage ratio converter stage configured to output a non-regulated bus voltage to the first stage output. The converter further comprises a second converter stage comprising a multi-level converter stage including a second stage input coupled to the first stage output to receive the non-regulated bus voltage and also including a second stage output, the multi-level converter stage configured to output a second stage output voltage (Vout) to the second stage output, the output voltage range being from a minimum output voltage (Vout_min) to a maximum output voltage (Vout_max) with a typical output voltage (Vout_typ). In such aspect, the non-regulated bus voltage is defined by a voltage conversion ratio ("n") of the input voltage over the non-regulated bus voltage of the first stage, and the multi-level converter stage comprises a boost converter and its Vout_min is greater than Vout_typ/2. Still further, the voltage conversion ratio ("n") of the first stage is equal to or greater than Vin_max/Vout_min; and the non-regulated bus voltage is within the wider of a range of Vout_typ/2 to Vout_min or a range of Vin_min/n to Vout_min.

Optionally, in any of the preceding aspects the voltage ratio converter stage comprises an open loop isolated LLC converter.

Optionally, in any of the preceding aspects the voltage ratio converter stage comprises an open loop isolated full-bridge converter.

Optionally, in any of the preceding aspects the voltage ratio "n" is fixed.

Optionally, in any of the preceding aspects the voltage ratio "n" is within a range of +/10% of a fixed ratio.

Optionally, in any of the preceding aspects the DC-DC converter has an operating range of Vin_min=36 V through Vin_max=75 V.

Optionally, in any of the preceding aspects the DC-DC converter has an output of 12V+/−10%.

Optionally, in any of the preceding aspects the conversion efficiency of the first stage is within a range of 97.0 to 99.5%.

Optionally, in any of the preceding aspects the conversion efficiency of the second stage is within a range of 97.5% to 99%.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate the same or similar elements.

DETAILED DESCRIPTION

A high efficiency, high power density, wide input and/or output voltage range, two stage DC-DC converter is provided. The two stage DC-DC converter consists of a multilevel DC-DC converter stage cascaded with a fixed voltage ratio DC-DC converter stage. The use of a multilevel DC-DC converter stage achieves voltage regulation with a wide input and/or output voltage range with high efficiency and power density. The use of a fixed voltage ratio, unregulated DC-DC converter stage provides high power conversion efficiency and power density. In one embodiment, the multilevel DC-DC converter stage is the first stage and the fixed voltage ratio, unregulated DC-DC converter stage is the second stage converter. In another embodiment, the fixed voltage ratio, unregulated DC-DC converter stage is the first stage and the multilevel DC-DC converter stage is the second stage. The multilevel DC-DC converter stage is non-isolated, while the fixed voltage ratio, unregulated DC-DC converter stage is isolated.

In one aspect, the converter is controlled so that a first stage of the converter provides an optimized output (a regulated bus voltage) which serves as the input to the second stage.

In order to achieve high efficiency and power density, the fixed voltage ratio stage is desirably constructed with a transformer having a whole integer turns ratio in the stage's transformer, e.g. a turns ratio of 2:1, 3:1 or 5:2 (2.5:1). This allows the fixed voltage ratio stage to have a conversion efficiency within a range of 97.0 to 99.5%. The DC-DC converter is used in applications where a typical supply voltage (V_typ) is supplied to the DC-DC converter input. In one embodiment, the first stage multilevel converter is controlled to provide an optimal intermediate bus voltage in a range of half of Vin_typ to Vin_min which serves as the input to the second stage. This operating window improves efficiency for specific applications where large step-down or step-up of a supply voltage is needed. The fixed voltage ratio converter stage typically has higher conversion efficiency than the voltage regulation stage which in this technology may comprise a buck, boost, multilevel buck, or multilevel boost converter.

To provide optimal efficiency, a bus voltage (Vbus) comprising the output voltage of a first stage and the input voltage of a second stage, is tightly controlled within a specific range. The converter is designed to receive in input voltage in a range of Vin_min to Vin_max. When the first stage is a multi-level converter stage and a buck converter, the buck converter stage is configured to cause the regulated bus voltage Vbus to be in a range between one half of a typical input voltage (V_typ—between Vin_min and Vin_max) and Vin_min, when Vin_min is greater than one half of the typical input voltage. When the multi-level converter stage comprises a boost converter, the boost converter is configured to cause the regulated bus voltage to be in a range of Vin_max to twice Vin_typ when Vin_max is less than twice Vin_typ.

The present disclosure will now be described with reference to the Figures, which in general relate to electric power circuits that may be used, for example, in telecom equipment. For example, circuits described here may be used for converting a supply voltage to a usable voltage for the equipment.

Figure 1:
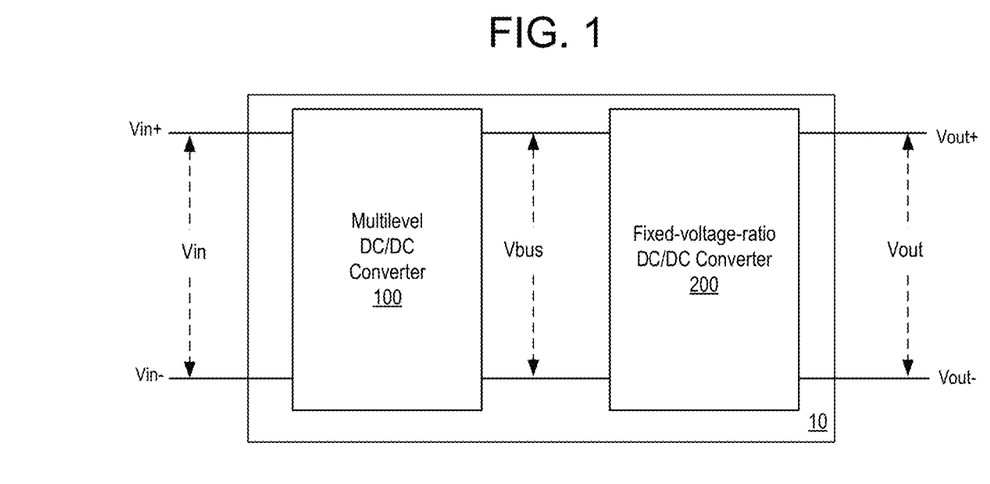
FIG. 1 is a block diagram of a first embodiment of an electronic circuit as disclosed herein.
Figure 2:
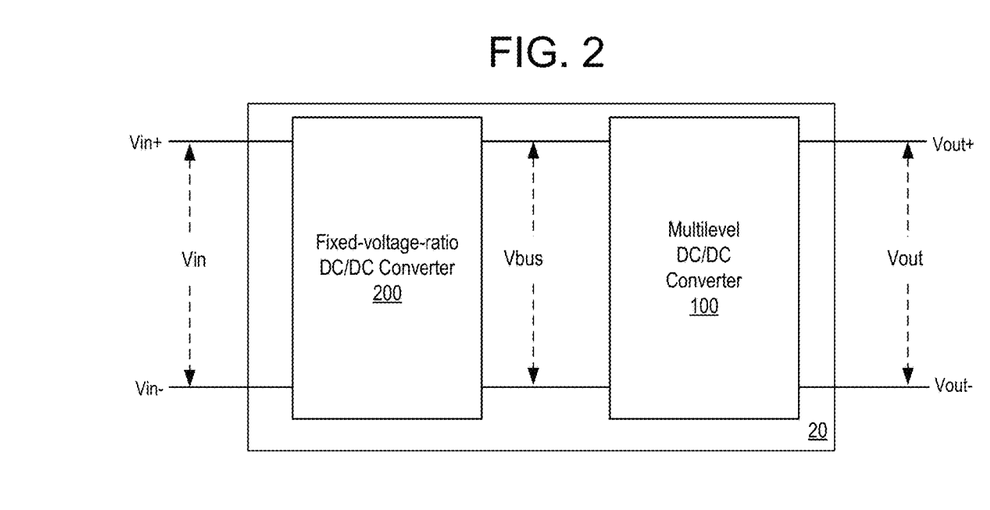
FIG. 2 is a block diagram of a second embodiment of an electronic circuit as disclosed herein.

FIG. 1 illustrates a first embodiment of the electronic circuit. The circuit 10 comprises a first stage comprising a multi-level DC-DC converter stage 100 receiving an input voltage Vin, followed by a second, fixed voltage ratio stage 200. The converter stages provide an output voltage Vout to a load (not shown). The load may be any form of equipment requiring a DC supply voltage, including, for example, telecom equipment, computing equipment or another electronic circuit (including, for example, another converter). FIG. 2 illustrates a second embodiment of the electronic circuit. The circuit 20 comprises a first stage comprising a fixed voltage ratio stage 200 receiving an input voltage Vin, followed a second, multi-level DC-DC converter stage 100. In the second embodiment, Vout is supplied by the multi-level DC-DC converter stage 100.

For each of the exemplary multi-level voltage stage embodiments discussed herein, and each of the exemplary fixed voltage ratio stage embodiments, the order of the stages between the input and the output may be reversed, as illustrated with respect to FIGS. 1 and 2. That is, either the multi-level voltage stage or the fixed voltage ratio stage may comprise the first or second stage.

In one embodiment, a first multi-level converter stage 100 has a first stage input and including a first stage output (Vbus). Vbus is a regulated voltage output from the first stage. The first stage input is configured to receive an input voltage in a range from a minimum voltage (Vin_min) to a maximum voltage (Vin_max), with a typical voltage (Vin_typ) being within the input voltage range.

The second, fixed voltage ratio converter stage has a second stage input coupled to the first stage output to receive the regulated, bus voltage Vbus. The output of the second stage is configured to output a second stage output voltage (Vout) comprising the output of the converter.

The regulated bus voltage is defined by a voltage conversion ratio ("n") of the regulated bus voltage Vbus over the second stage output voltage Vout.

The multi-level converter stage in one embodiment comprises a buck converter which provides regulated bus voltage Vbus in a range of Vin_typ/2 to Vin_min when Vin_min is greater than Vin_typ/2. In another embodiment, the multi-level converter stage comprises a boost converter which provides the regulated bus voltage Vbus to be in a range of Vin_max to Vin_typ*2 when Vin_max is less than Vin_typ*2.

Figure 3:
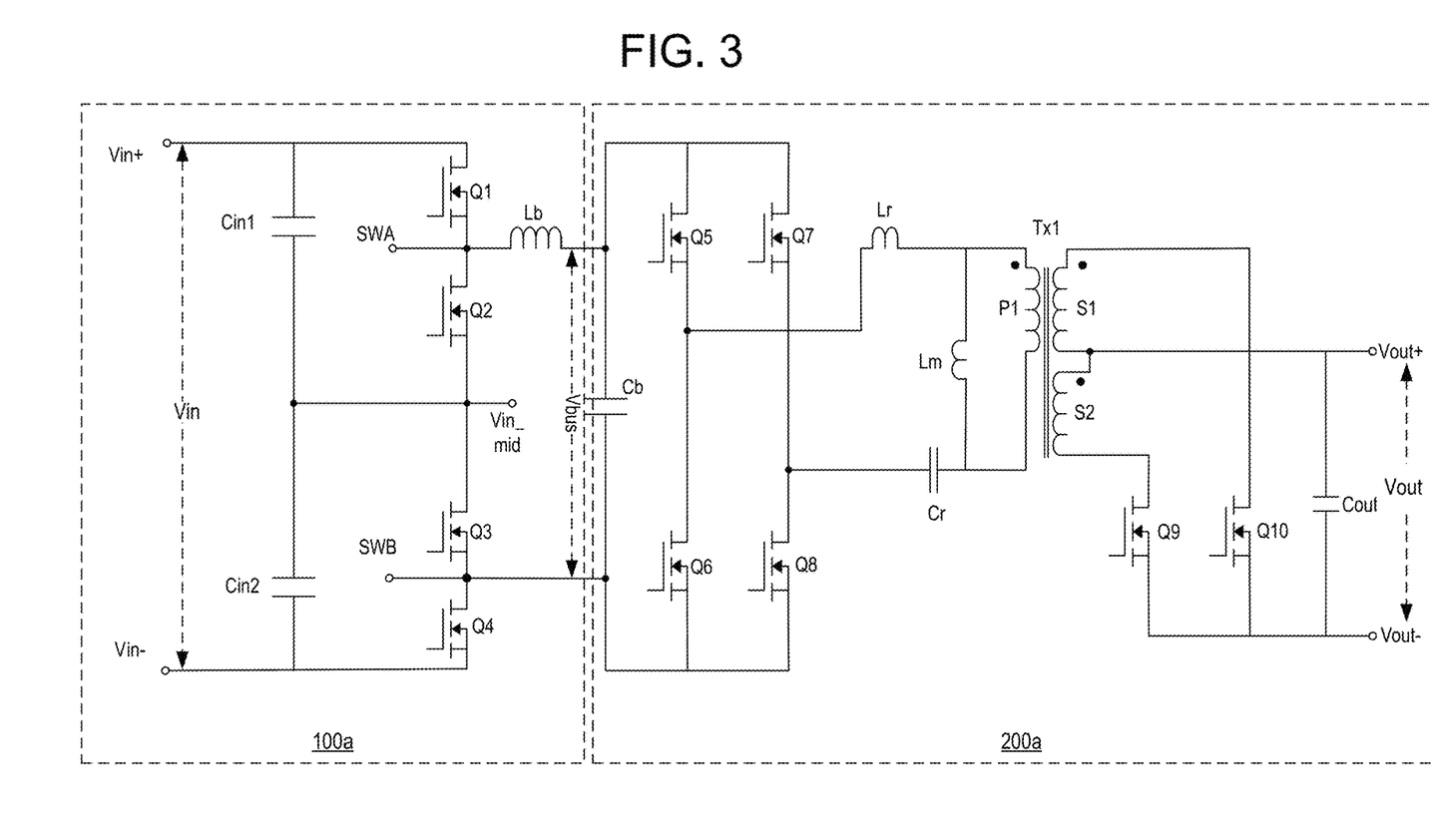
FIG. 3 is a schematic diagram of an embodiment of the electronic circuit comprising a three-level buck converter first stage and an LLC resonant converter second stage in accordance with the embodiment of FIG. 1.

FIG. 3 is a schematic diagram of one embodiment of the circuit illustrated in block form in FIG. 1. FIG. 3 illustrates a first stage multi-level converter 100a comprising a three-level buck converter, and a second stage fixed voltage ratio converter 200a comprising an LLC resonant converter.

The buck converter 100a is configured to receive an input voltage Vin over an input voltage range, and provide the regulated, bus voltage (Vbus), which serves as the input to the second stage resonant converter 200a. The buck converter stage outputs a regulated bus voltage Vbus in a range of Vin_typ/2 to Vin_min when Vin_min is greater than Vin_typ/2.

The buck converter 100a is configured to provide a Vbus at or near (within 10 percent) of the desired output voltage (Vout) of the second stage multiplied by the fixed ratio of the second stage. For example, for a 12V output voltage and a fixed voltage ratio of 2.5, Vbus would be approximately 30V. In this example, Vout may be regulated at 12V with a tolerance, e.g., +/−3%.

The buck converter 100a includes input capacitors Cin1 and Cin2 coupled in series which each other, and in parallel with four switches Q1-Q4. The switches Q1-Q4 are illustrated herein as MOSFETs but alternative switching technologies may be utilized without departing from the nature of the technology. Two switch nodes SWA and SWB are provided between switches Q1 and Q2, and Q3 and Q4, respectively. An output inductor, Lb, is coupled between switches Q1 and Q2. The output of inductor Lb and the tap between Q3 and Q4 comprises the stage output voltage, Vbus which is provided to the second stage 200a.

The buck converter 100a is controlled by a duty cycle D, and the output voltage of the three-level buck converter 100a can be expressed as Vbus=D·Vin. The voltage conversion ratios may be defined as N(tot)=Vin/Vout, n1=Vin/Vbus, and n=Vbus/Vout. As such, N(tot)=n1*n, where N(tot) is the voltage conversion ratio of the 2-stage cascaded DC-DC converter, n1 is the voltage conversion ratio of the first stage DC-DC converter, and n is the voltage conversion ratio of the second stage DC-DC converter.

A pulse width modulation (PWM) controller (not shown) controls the gate voltages and switching cycle of the switches Q1-Q4 in the voltage regulation converter stage in all illustrated embodiments. The fixed voltage ratio converter stage typically operates in unregulated and open loop mode, and thus doesn't need PWM and closed loop feedback control.

Figure 4:
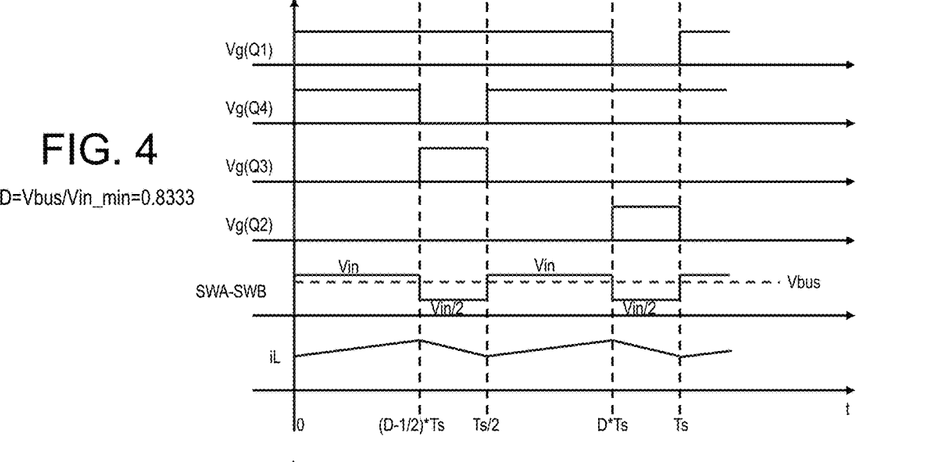
FIG. 4 is a timing diagram of the switching control for the first stage three-level buck converter of FIG. 3 when the input voltage is at a minimum level of an input voltage range.
Figure 5:
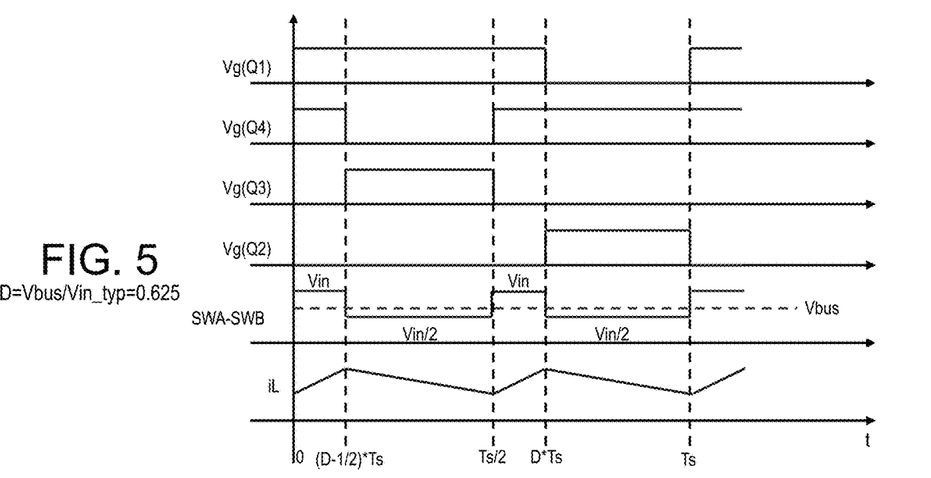
FIG. 5 is a timing diagram of the switching control for the first stage three-level buck converter of FIG. 3 when the input voltage is at a typical level of an input voltage range.
Figure 6:
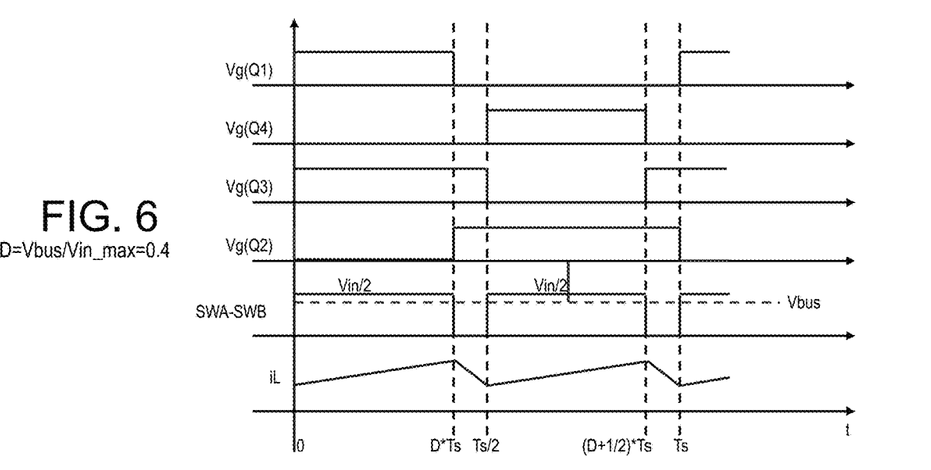
FIG. 6 is a timing diagram of the switching control for the first stage three-level buck converter of FIG. 3 when the input voltage is at a maximum level of an input voltage range.

The switching cycle for three different input voltages for the first stage, buck converter 100a of FIG. 3 are illustrated in FIGS. 4-6. FIG. 4 illustrates the switching cycle for Vin at the minimum (Vin_min) of in the input range, 36V. FIG. 5 illustrates the switching cycle for Vin at a typical voltage, Vin_typ of 48V, and FIG. 6 illustrates the switching cycle for Vin at the maximum (Vin_max) of 75V.

In FIGS. 4-6, the switching period Ts is equal to 1 over the frequency (fs) (Ts=1/fs). Assuming a circuit efficiency of the buck stage 100a is 100%, and the bus voltage Vbus=30V, then the duty cycle D of the buck converter is as follows: for Vin=Vin_min=36V, D=Vbus/Vin=30V/36V=0.8333; for Vin=Vin_typ=48V, D=Vbus/Vin=30V/48V=0.625; and for Vin=Vin_max=75V, D=Vbus/Vin=30V/75V=0.4.

FIGS. 4-6 illustrate the gate drive voltages Vg(Q1)-Vg(Q4) for switches Q1-Q4, respectively, the switching node voltage at the connection node SWA between Q1 and Q2, the switching node voltage at the connection node SWB between Q3 and Q4, and the current iL in inductor Lb. In this embodiment, Q1 and Q4 are the controlling switches; Q2 and Q3 are freewheeling switches.

With reference to FIGS. 4-6, in each instance, the gate drive timing of Q4 is shifted by Ts/2 from the gate drive timing of Q1, (i.e. Q4 is 180° out of phase to the gate drive timing of Q1). The gate drive timing of Q2 is complimentary to Q1; the gate drive timing of Q3 is complimentary to Q4. The turn-on duty cycle of Q1 and Q4 are both D; the turn-on duty cycle of Q2 and Q3 are both 1-D.

The switching cycle consists of four stages. For example, in FIG. 4 (refer to the circuit diagram in FIG. 3), the first stage of the cycle from time t=0 to t=(D−½)*Ts has Q1 and Q4 on, presenting Vin at the switch nodes SWA and SWB, and generating a rising current iL in the inductor Lb. During the second stage from t=(D−½)*Ts to t=Ts/2, Q4 is turned off and Q3 is turned on, bringing the voltage between switch node SWA and SWB down to Vin/2. This de-energizes the inductor Lb.

In the third stage from t=Ts/2 to t=D*Ts, the controller turns on Q4 and turns off Q3 (Q1 remaining on), again connecting Vin across the switch nodes and inductor Lb charges.

Finally, the fourth stage from t=D*Ts to Ts turns off Q1 and turns Q2 on (Q4 remaining on), bringing SWA-SWB to Vin/2. This de-energizes the inductor once again in preparation for the next cycle.

As illustrated by comparing FIGS. 4-6, the duty cycle changes the stage duration and hence the bus output voltage (Vbus) which is provided to the fixed-ratio voltage stage. When configured for operation in the above configuration, the buck converter stage 100a outputs a regulated bus voltage Vbus in a range of Vin_typ/2 to Vin_min when Vin_min is greater than Vin_typ/2.

The second, fixed voltage ratio stage is configured with an LLC resonant converter. Referring to the circuit diagram in FIG. 3, the second stage converter includes a full bridge inverter and a resonant tank on the primary side of transformer TX1, and a full-wave synchronous rectifier on the secondary side of the transformer TX1. A capacitor Cb is coupled to the output of the first stage buck converter 100a. The full bridge inverter comprises switches Q5-Q8, and is coupled to a resonant tank comprising inductor Lr, capacitor Cr, and magnetizing inductance Lm of the transformer TX1. The resonant tank is coupled to primary winding P1. The four switches Q5-Q8 form a full bridge having two legs. Switches Q5 and Q6 are connected in series and share a first common node, and switches Q7 and Q8 are connected in series and share a second common node. The resonant tank is connected to the two common nodes of the two legs.

The secondary side of the transformer Tx1 is center-tapped. Such a center-tapped secondary and two switches Q9 and Q10 forms a full wave rectifier. The output voltage may then be supplied to a load (not shown).

The switching scheme of the second stage fixed voltage ratio LLC resonant converter 200a may operate as follows. The switches Q5 and Q8 are turned on simultaneously for slightly lower than 50% of the switching period during a first half cycle. In this first half cycle, switch Q9 on the secondary side is turned on working as a synchronous rectifier, and switch Q10 is turned off. The load current flows through Q9. After a period of dead time, the switches Q6 and Q7 are turned on simultaneously for an equal time during the second half cycle. In this second half cycle, switch Q10 on the secondary side is turned on in synchronous rectification mode, and switch Q9 is turned off. The load current flows through Q10. As a result, Vbus and −Vbus are applied to the primary side of the transformer Tx1 in alternate half periods.

In a fixed duty cycle control scheme, the turn-on time of the switches Q5 and Q8 may be equal to the turn-on time of the switches Q6 and Q7.

As noted above, the fixed voltage ratio step down between the bus voltage Vbus and the output voltage Vout may be created by the turns ratio between the primary winding P1 and secondary windings S1, S2. In one embodiment, the turns ratio is a whole-integer ratio optimized for the particular use application of the converter 10, 20.

In the embodiment of FIG. 3, the voltage ratio converter stage 200a can be configured with a wide output voltage range including a minimum output voltage (Vout_min), a typical output voltage (Vout_typ), and a maximum output voltage (Vout_max). The voltage conversion ratio ("n") of the second stage is equal to or less than Vin_min/Vout_max, and the regulated bus voltage (Vbus) may be within the wider of a range of Vin_typ/2 to Vin_min or a range of n*Vout_min to Vin_min.

As illustrated in FIGS. 4-6, the bus voltage Vbus is constant.

Figure 7:
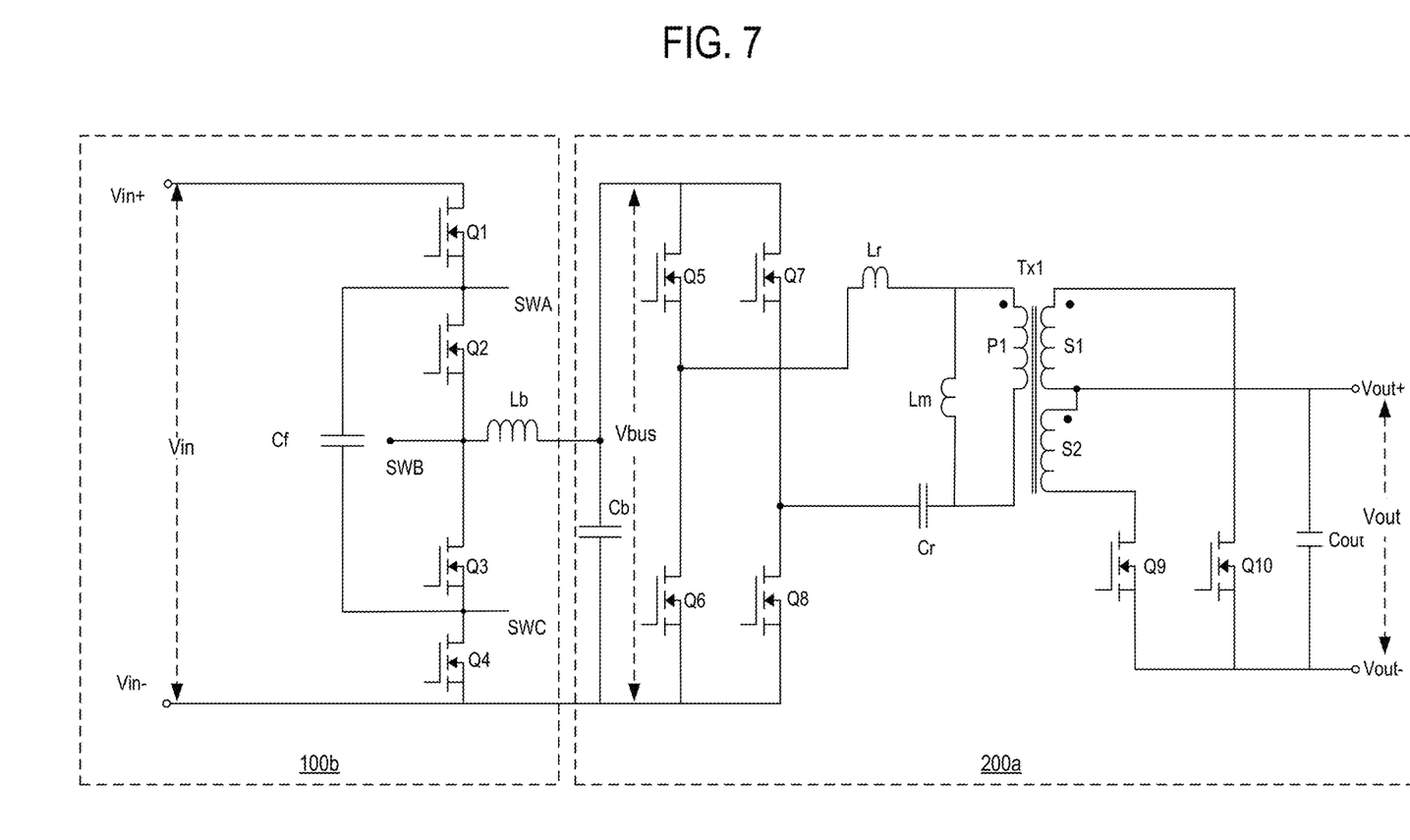
FIG. 7 is a schematic diagram of an embodiment of the electronic circuit comprising a three-level buck converter first stage and an LLC resonant converter second stage in accordance with the embodiment of FIG. 1.

FIG. 7 is a schematic diagram illustrating a second embodiment of a converter in accordance with the technology. In the embodiment of FIG. 7, the multilevel converter stage is a three-level buck converter 100b with a flying capacitor Cf coupled between switches Q1 and Q2, and Q3 and Q4. In the embodiment of FIG. 7, the switching cycle for the buck converter stage 100b again consists of four stages. Depending on whether D<0.5 or D>0.5, a three level buck or boost converter has two operation modes. (D=0.5 is at the boundary and can be considered as either mode.)

Figure 8:
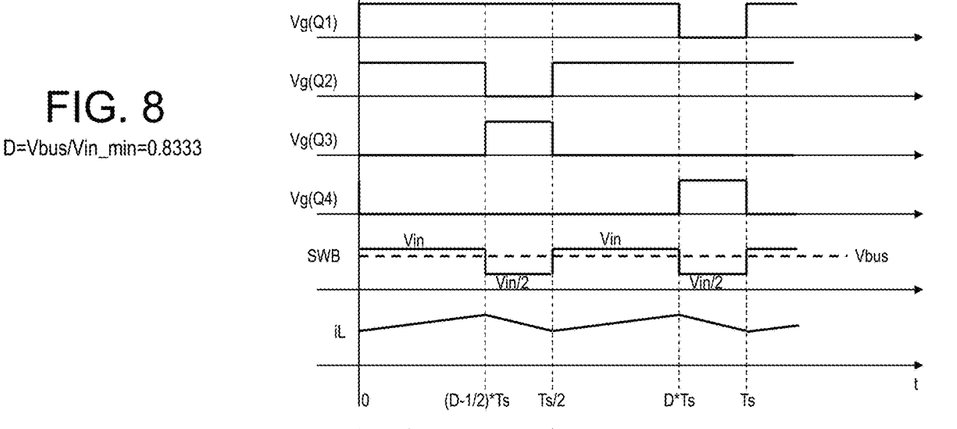
FIG. 8 is a timing diagram of the switching control for the first stage three-level buck converter of FIG. 7 when the input voltage is at a minimum level of an input voltage range.
Figure 9:
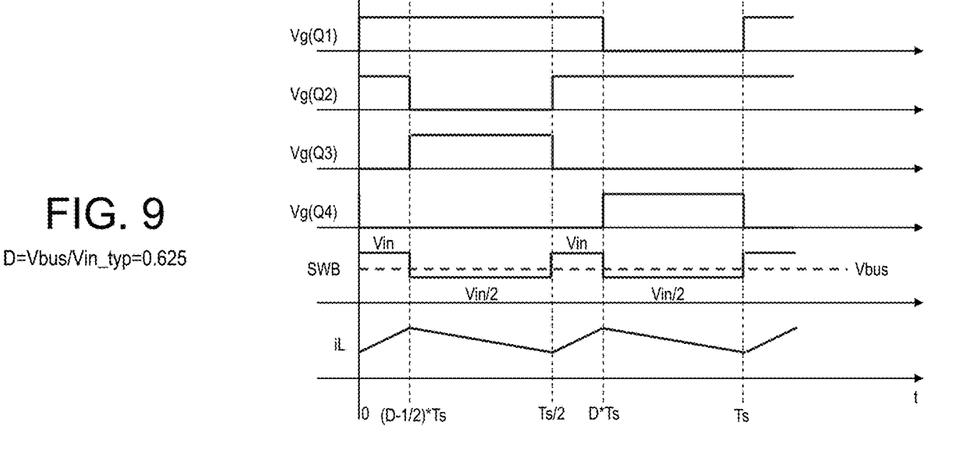
FIG. 9 is a timing diagram of the switching control for the first stage three-level buck converter of FIG. 7 when the input voltage is at a typical level of an input voltage range.
Figure 10:
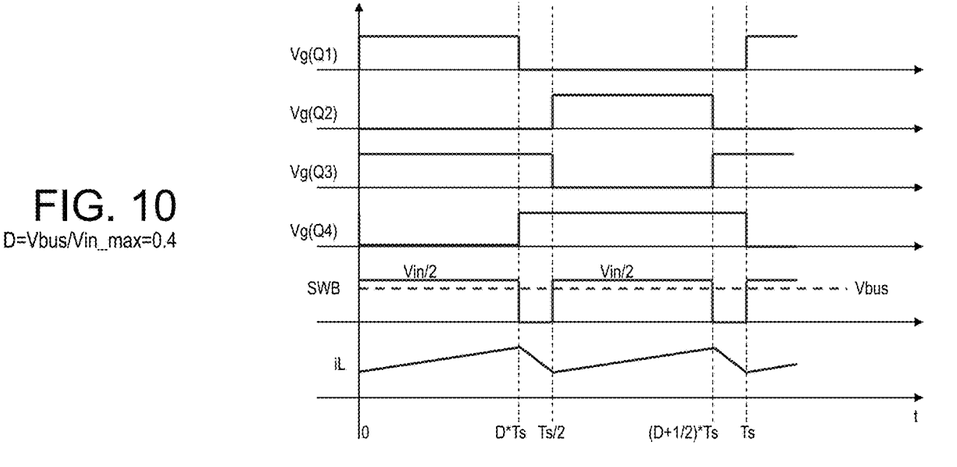
FIG. 10 is a timing diagram of the switching control for the first stage three-level buck converter of FIG. 7 when the input voltage is at a maximum level of an input voltage range.

The switching cycle for three different input voltages for the first stage, buck converter 100b of FIG. 7 are illustrated in FIGS. 8-10. FIG. 8 illustrates the switching cycle for Vin at the minimum (Vin_min) of in the input range, 36V. FIG. 9 illustrates the switching cycle for Vin at a typical voltage, Vin_typ of 48V, and FIG. 10 illustrates the switching cycle for Vin at the maximum (Vin_max) of 75V. It will be noted that the control timing drawings of FIGS. 8-10 are very similar to those for three-level buck converter with input capacitor divider (FIGS. 4-6). The Q2 and Q4 gate drives of converter stage 100b are swapped relative to converter stage 100a.

With reference to FIG. 10, taking D<0.5 as an example, in the first stage, Q1 and Q3 are on, presenting Vin/2 at the switch node SWB and the capacitor Cf gets charged while the inductor Lb is energized. During the second stage Q1 is turned off and Q4 is turned on, bringing the switch node SWB to ground. This leaves capacitor Cf disconnected, and de-energizes the inductor Lb. In the third stage, the controller turns off Q3 and turns on Q2, connecting the CF capacitor directly across the switch node SWB and the input ground Vin−, discharging the Cf capacitor voltage, and energizing the inductor current in inductor Lb.

Finally, the fourth stage turns off Q2 and turns Q3 back on, connecting the Q3 directly to ground through Q4. This leaves the capacitor disconnected, and de-energizes the inductor once again in preparation for the next cycle. As the input voltage decreases, the controller can increase the duty cycle in order to maintain a regulated output voltage Vbus at the levels discussed herein.

The second, fixed voltage ratio stage is configured with an LLC resonant converter equivalent to that shown in FIG. 3. The second stage converter is operated as discussed above with respect of FIG. 3.

Figure 11:
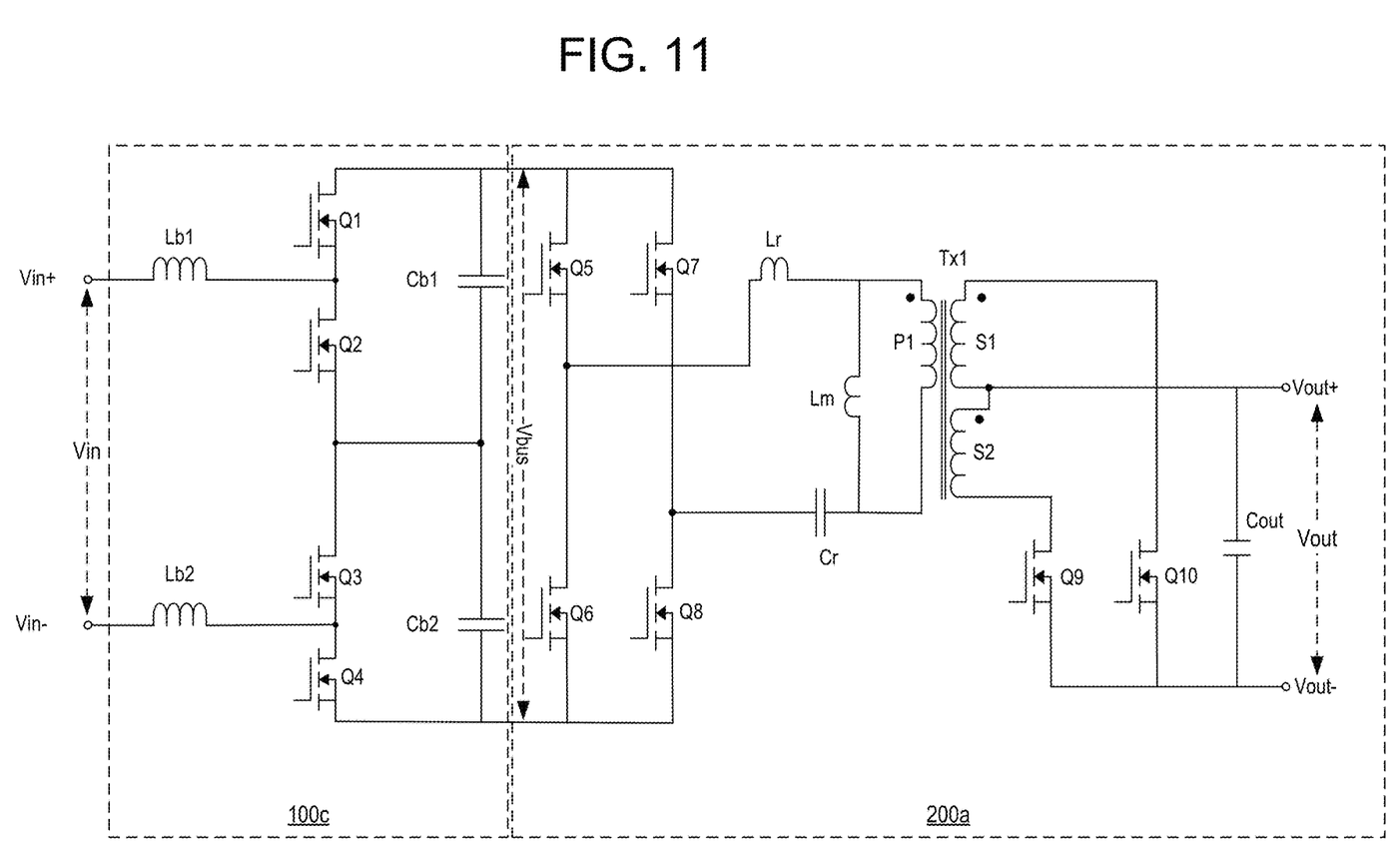
FIG. 11 is a schematic diagram of an embodiment of the electronic circuit comprising a three-level boost converter first stage and an LLC resonant converter second stage in accordance with the embodiment of FIG. 1.

FIG. 11 illustrates another embodiment of the DC-DC converter shown in FIG. 1. In the embodiment of FIG. 11, the multi-level first stage comprises a boost converter 100c, while the fixed voltage ratio stage is an LLC converter 200a, as discussed above.

In this embodiment, the first multi-level converter stage 100c has a first stage input and including a first stage output (Vbus), the regulated voltage output from the first stage. The first stage input is configured to receive an input voltage in a range from a minimum voltage (Vin_min) to a maximum voltage (Vin_max), with a typical voltage (Vin_typ) being within the input voltage range.

The regulated bus voltage defined by a voltage conversion ratio ("n") of the regulated bus voltage Vbus over the second stage output voltage (Vout).

The multi-level converter stage in this embodiment is a boost converter configured to cause the regulated bus voltage to be in a range of Vin_max to Vin_typ*2 when Vin_max is less than Vin_typ*2.

The switching scheme for the converter illustrated in FIG. 11 allows boost inductors Lb1 and Lb2, connected to the input voltage, to be charged when Q2 and/or Q3 are turned on. When the related switch (Q2 and/or Q3) are turned off, the energy stored in the inductor is transferred to the second stage 200a. At the same time, Q5 to Q8 are switched to apply Vbus and −Vbus across the LLC resonant tank alternately. The switches Q2 and Q3, and Q1 and Q4 have a 180° phase shift with respect to each other.

As in the previous embodiments, the second, fixed voltage ratio stage is configured with an LLC resonant converter 200a equivalent to that shown in FIG. 3. In one configuration, the voltage ratio converter stage has a wide output voltage range including a minimum output voltage (Vout_min), a typical output voltage (Vout_typ), and a maximum output voltage (Vout_max). The voltage conversion ratio can be configured such that the conversion ratio of the second stage is equal to or greater than Vin_max/Vout_min and the boost converter stage configured to provide a regulated bus voltage that is within the wider of a range of Vin_max to Vin_typ*2 or Vin_max to n*Vout_max.

Figure 12:
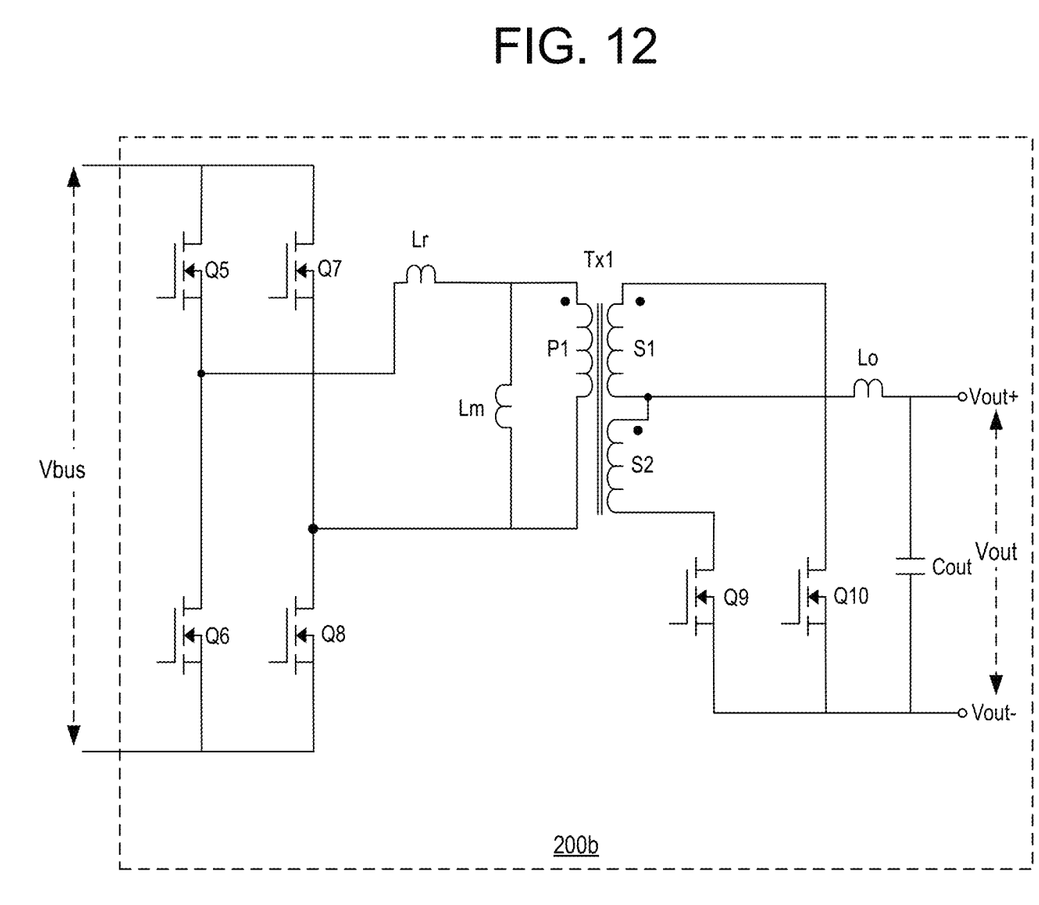
FIG. 12 is a schematic diagram of an embodiment of a fixed voltage ratio converter stage comprising a phase shifted full bridge converter.
Figure 13:
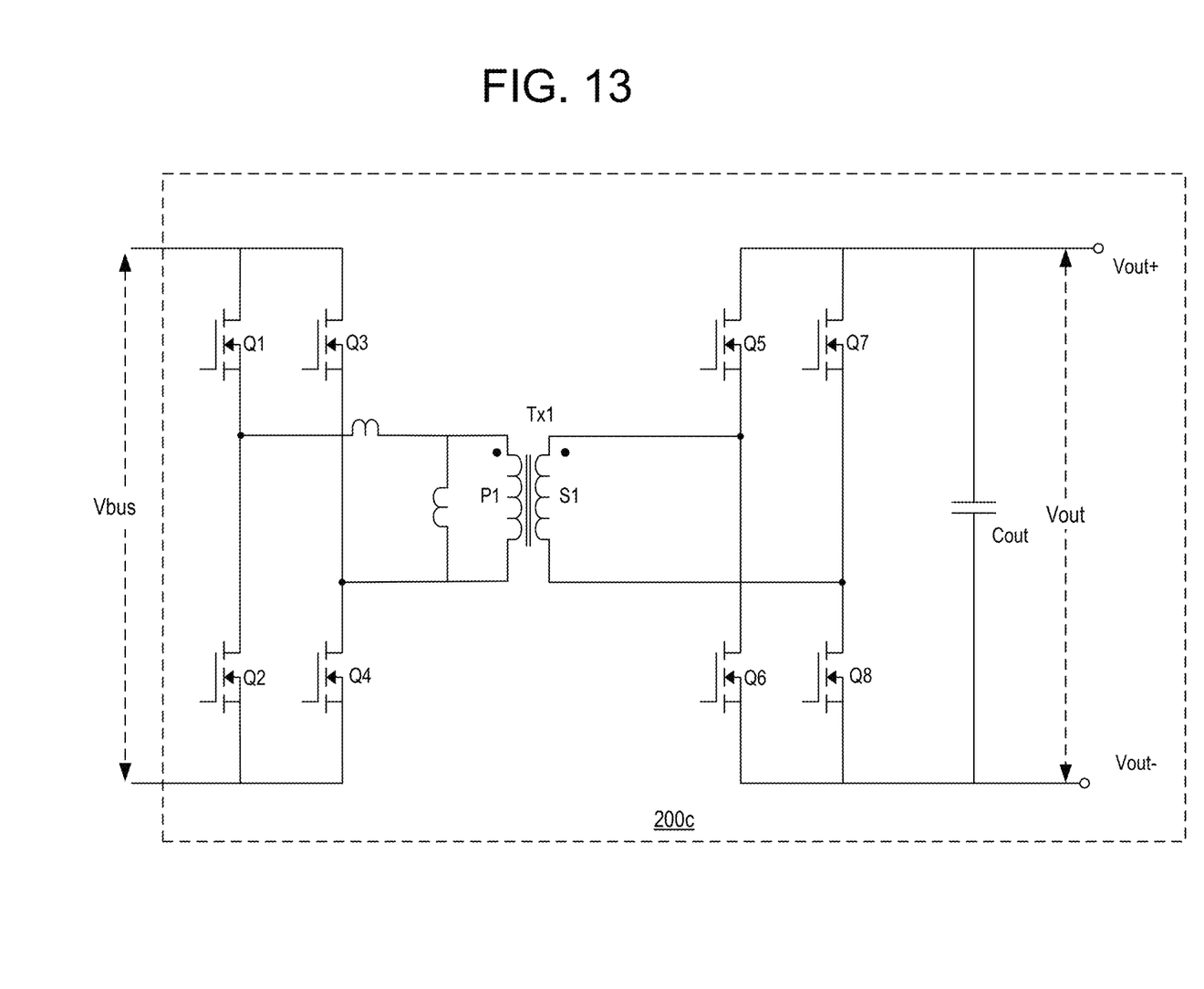
FIG. 13 is a schematic diagram of an embodiment of a fixed voltage ratio converter stage comprising a dual active bridge converter.

FIG. 12 illustrates an alternative fixed voltage ratio stage configuration which comprises a phase shifted full bridge converter 200b which can be used in place of the resonant converter 200c in the embodiment of FIGS. 3, 7 and 8. FIG. 13 illustrates a dual active bridge converter 200c which can be used in place of the resonant converter 200c in the embodiment of FIGS. 3, 7 and 8. Either of these alternative stages provides a fixed voltage ratio between their input (Vbus) and their output and is able to achieve very high power efficiency.

Figure 14:
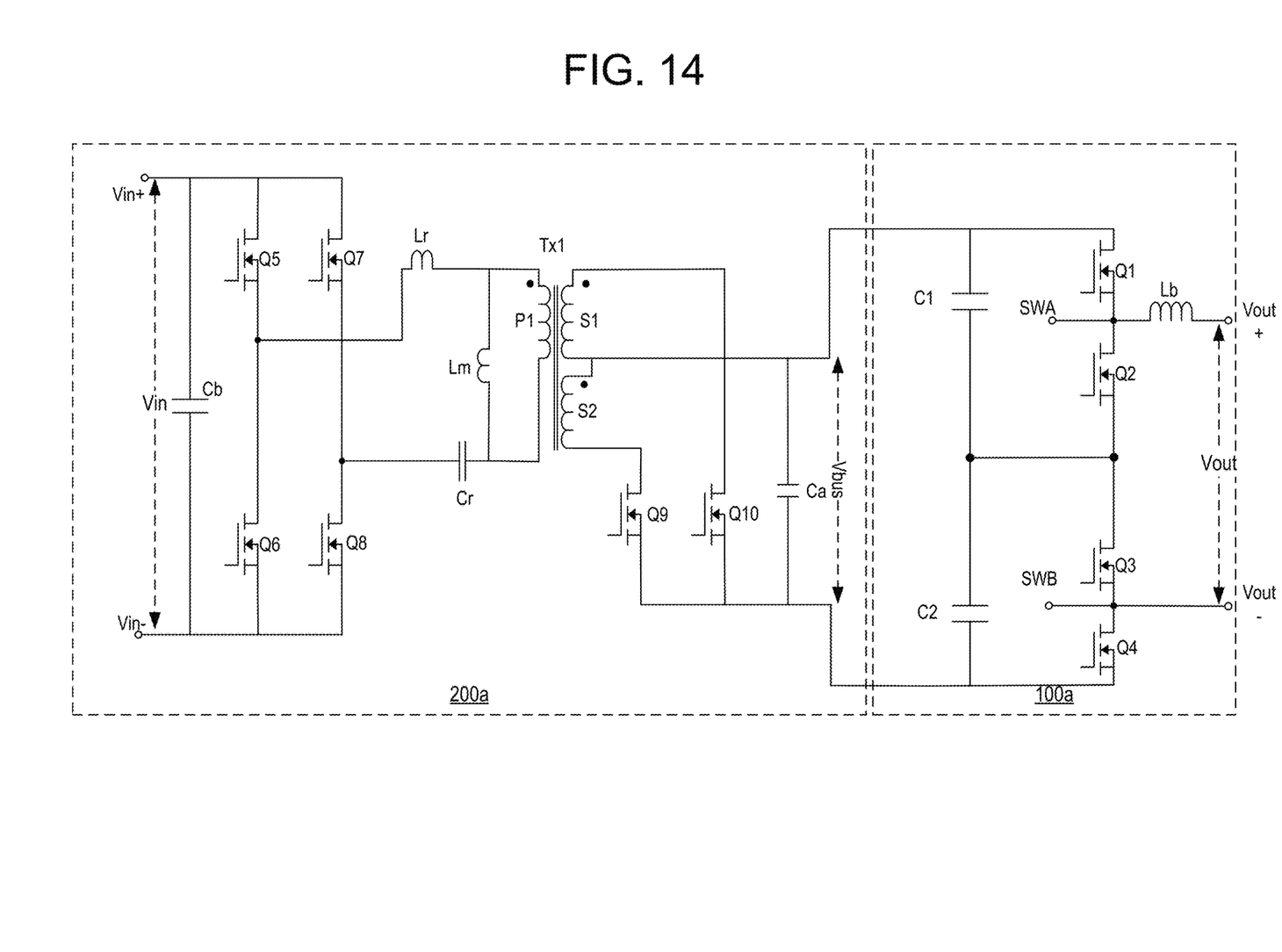
FIG. 14 is a schematic diagram of a second embodiment of the electronic circuit comprising a resonant converter fixed voltage ratio first stage and a buck converter second stage.

FIG. 14 illustrates another embodiment of the electronic circuit configured as shown in block form in FIG. 2. In this embodiment, the fixed voltage ratio converter comprises the first stage while the multi-level converter comprises the second stage. In this embodiment, the fixed voltage ratio converter is an LLC resonant converter 200a while the multi-level converter comprises a buck converter 100a.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A DC-DC converter, comprising:
a first converter stage comprising a voltage ratio converter stage having a first stage input and including a first stage output, the first stage input configured to receive an input voltage in a range from a minimum voltage (Vin_min) of approximately 36 V to a maximum voltage (Vin_max) of approximately 75V, with a typical voltage (Vin_typ) being approximately within the range, and the voltage ratio converter stage configured to output a non-regulated bus voltage to the first stage output; and
a second converter stage comprising a multi-level converter stage including a second stage input coupled to the first stage output to receive the non-regulated bus voltage and also including a second stage output, the multi-level converter stage configured to output a second stage output voltage (Vout) to the second stage output, the output voltage having an output voltage range from a minimum output voltage (Vout_min) to a maximum output voltage (Vout_max) with a typical output voltage (Vout_typ), wherein the non-regulated bus voltage defined by a voltage conversion ratio ("n") of the input voltage over the non-regulated bus voltage of the first converter stage, the multi-level converter stage comprises a buck converter and the Vout_max is less than Vout_typ*2;

the voltage conversion ratio ("n") of the first stage is equal to or less than Vin_min/Vout_max, and the non-regulated bus voltage is within the wider of a range of Vout_max to Vout_typ*2 or a range of Vout_max to Vin_max/n.

2. The DC-DC converter of claim 1 wherein the voltage ratio converter stage comprises an open loop isolated LLC converter, an open loop isolated phase shifted full-bridge converter, or a dual-active bridge converter.

3. The DC-DC converter of claim 1 wherein the voltage conversion ratio "n" is fixed or wherein the voltage ratio "n" is within a range of +/10% of a fixed ratio.

4. The DC-DC converter of claim 1 wherein the DC-DC converter has an output of 12V+/−10%.

5. The DC-DC converter of claim 1 wherein a conversion efficiency of the first stage voltage ratio converter stage is within a range of 97.5 to 99.5%.

6. The converter of claim 1 wherein a conversion efficiency of the second stage multilevel converter stage is within a range of 97.0% to 99.0%.

7. A DC-DC converter, comprising:

a first converter stage comprising a voltage ratio converter stage having a first stage input and including a first stage output, the first stage input configured to receive an input voltage in a range from a minimum voltage (Vin_min) of approximately 36V to a maximum voltage (Vin_max) of approximately 75V, with a typical voltage (Vin_typ) being within the range, and the voltage ratio converter stage configured to output a non-regulated bus voltage to the first stage output; and a second converter stage comprising a multi-level converter stage including a second stage input coupled to the first stage output to receive the non-regulated bus voltage and also including a second stage output, the multi-level converter stage configured to output a second stage output voltage (Vout) to the second stage output, the output voltage range from a minimum output voltage (Vout_min) to a maximum output voltage (Vout_max) with a typical output voltage (Vout_typ) wherein, the non-regulated bus voltage defined by a voltage conversion ratio ("n") of the input voltage over the non-regulated bus voltage of the first converter stage, the multi-level converter stage comprises a boost converter and the Vout_min is greater than Vout_typ/2, the voltage conversion ratio ("n") of the first stage is equal to or greater than Vin_max/Vout_min, and the non-regulated bus voltage is within the wider of a range of Vout_typ/2 to Vout_min or a range of Vin_min/n to Vout_min.

8. The DC-DC converter of claim 7 wherein the voltage ratio converter stage comprises an open loop isolated LLC converter, an open loop isolated phase shifted full-bridge converter, or a dual-active bridge converter.

9. The DC-DC converter of claim 7 wherein the voltage conversion ratio "n" is fixed or wherein the voltage ratio "n" is within a range of +/−10% of a fixed ratio.

10. The DC-DC converter of claim 7 wherein the DC-DC converter has an output of 12V+/−10%.

11. The DC-DC converter of claim 7 wherein the conversion efficiency of the first stage voltage ratio converter stage is within a range of 97.5 to 99.5%.

12. The converter of claim 7 wherein the conversion efficiency of the second stage multilevel converter stage is within a range of 97.0% to 99.0%.

* * * * *